(12) United States Patent
Williams

(10) Patent No.: US 7,284,526 B2
(45) Date of Patent: Oct. 23, 2007

(54) ELLIPSOID ROLLER BEARING PISTON RING

(76) Inventor: Allan R. Williams, 959 Daley St., Edmonds, WA (US) 98020

( * ) Notice: Subject to any disclaimer, the term of this patent is extended or adjusted under 35 U.S.C. 154(b) by 0 days.

(21) Appl. No.: 11/422,140

(22) Filed: Jun. 5, 2006

(65) Prior Publication Data

US 2007/0039461 A1    Feb. 22, 2007

Related U.S. Application Data

(60) Provisional application No. 60/688,953, filed on Jun. 9, 2005.

(51) Int. Cl.
*F16J 1/02* (2006.01)
(52) U.S. Cl. .................... 123/193.6; 92/178
(58) Field of Classification Search ................. 92/178; 123/193.6
See application file for complete search history.

(56) References Cited

U.S. PATENT DOCUMENTS

| | | | | |
|---|---|---|---|---|
| 2,712,483 A | * | 7/1955 | Ciaccia | 92/178 |
| 3,327,593 A | * | 6/1967 | Ciaccia | 92/178 |
| 3,398,653 A | * | 8/1968 | Foster | 92/178 |
| 3,466,054 A | * | 9/1969 | Berg | 277/549 |
| 4,440,069 A | * | 4/1984 | Holtzberg et al. | 92/224 |
| 4,596,179 A | * | 6/1986 | Bando | 92/178 |
| 4,704,949 A | * | 11/1987 | Foster | 92/160 |
| 4,848,212 A | * | 7/1989 | Kawano et al. | 92/158 |
| 5,437,220 A | * | 8/1995 | Cheng et al. | 92/178 |
| 5,615,600 A | * | 4/1997 | Cheng et al. | 92/178 |
| 5,893,318 A | * | 4/1999 | Cheng et al. | 92/169.1 |

* cited by examiner

*Primary Examiner*—Marguerite McMahon
(74) *Attorney, Agent, or Firm*—Black Lowe & Graham PLLC

(57) ABSTRACT

An improved piston ring suitable for use in an internal combustion engine is disclosed comprising a plurality of races sized to receive elongate rollers disposed around the circumference thereof. The elongate rollers may be shaped as a prolate ellipsoid or other rounded shape. The piston ring may seat within a groove in fluid communication with an oil channel extending through a piston rod and opening into a rod bearing connecting the piston rod to a crankshaft. A crankshaft has a corresponding oil channel therewith and has an opening positioned to periodically align with the opening in the rod bearing when rotated. Oil is pumped into the oil channel in the crankshaft to force oil over the piston rings. Drain apertures may be formed in another groove formed in the piston to conduct oil away from the piston.

7 Claims, 9 Drawing Sheets

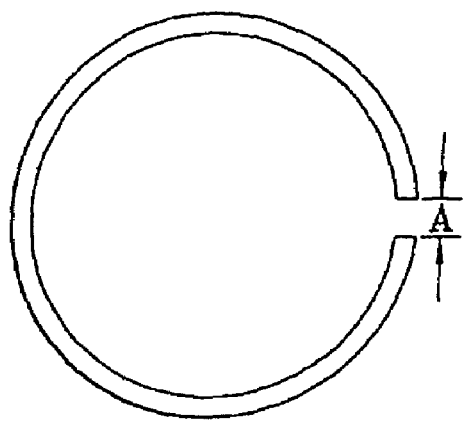
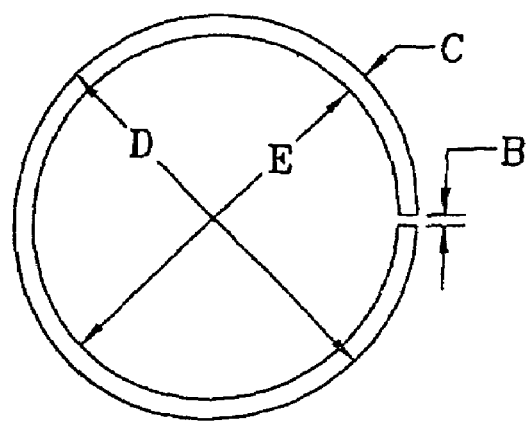
FIG. 3A  FIG. 3B
FIG. 3E
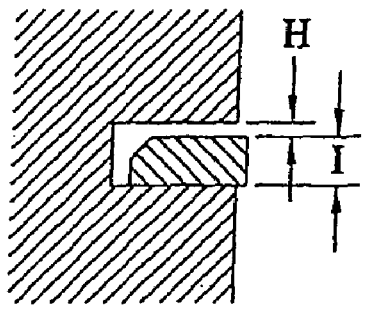
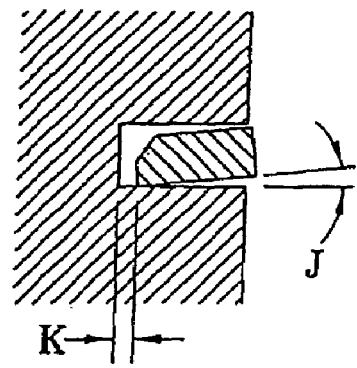
FIG. 3C  FIG. 3D

ELLIPSOID ROLLER BEARING PISTON RING

RELATED APPLICATIONS

This application claims the benefit of U.S. Provisional Patent Application Ser. No. 60/688,953 filed Jun. 9, 2005 and entitled, "RINGS FOR PISTONS AND METHOD FOR SEALING PISTONS IN CYLINDERS."

FIELD OF THE INVENTION

The present invention pertains to piston rings and, more particularly, to compression rings and oil rings having rollers and related methods and lubrication systems for reducing friction and increasing torque and horsepower transmission, particularly in internal combustion engines.

BACKGROUND OF THE INVENTION

Piston-and-cylinder assemblies are used in a variety of fields, including combustion engines, hydraulics, and pneumatics. Typical assemblies include a piston slideably mounted within a cylinder to fill, pressurize, and evacuate substance in the cylinder. This can include air-fuel mixtures, liquids, and gasses.

FIG. 1 illustrates a typical assembly 20 in which a piston 22 is slideably received within a cylinder bore 24 formed in a block 26. A cylinder head 28 is attached to the block 26 to form a chamber 30 between the top surface 32 of the piston 22 and an inside surface 34 of the cylinder head. Because the piston 22 has a diameter slightly smaller than the diameter of the cylinder bore 24, a space 36 is created therebetween. While this reduces friction between the piston 22 and the wall 38 of the cylinder bore 24, it enables substance to pass from the chamber 30 to outside the cylinder bore 24. In other words, when the piston 22 slides upward in the cylinder 24 towards the cylinder head 28, compression of substance within the chamber 30 will force some of the substance into the space 36 between the piston 22 and the cylinder wall 38. To prevent this from happening, resilient rings are employed.

More particularly, the selection of piston rings for an engine or other combustion application is related to the particular type of engine. Because different engines have varying requirements, such as competitive racing engines, truck engines, sport engines, and engines designed for specific fuels such as diesel, aircraft, automobile, as well as alcohols and nitrous oxides; all may require specific differences in materials and design. Piston rings function to contain and maintain in the cylinder chamber 30 a combustion pressure, to prevent oil from getting into the combustion chamber 30, and to assist in the control of temperature in the engine.

As shown in FIG. 1, there are three rings comprising a top ring known as a compression ring 40, a second ring or secondary compression ring 42, and a third ring or oil control ring 44. The top ring 40 aids in sealing against loss of pressure during the combustion process. It is designed to maintain a high buildup of pressure as the piston arrives at the top of its stroke and when the combustible mixture is ignited, building up additional pressure to force the piston 22 downward. Several design criteria aid in the ability of the piston ring to maintain this pressure, including ring gap, material resiliency, and the size and spacing of the ring 40 with respect to the piston 22 and the cylinder wall 38.

The second compression ring 42 is similar to the first compression ring 40 in that it has a ring gap that allows gasses to further penetrate down the space 36 between the piston 22 and the cylinder wall 38. This passing of the hot gasses is known as blow-by, and can have detrimental affects on the engine. This includes contaminating the oil with carbon particles from the combustion process, raising the acidic level and heating up the oil and speeding up the oxidation process. This in turn allows the carbon particles to wear out all the parts that the oil is expected to lubricate. This ring also serves as an oil scraper to minimize oil above the second ring 42.

The oil ring 44 is designed to aid in lubrication of the other rings, pistons, the rod, wrist pins, and cylinder walls while preventing the oil from interfering with the combustion process. The oil ring 44 also assists in the thermal control of the piston 22 by aiding in passing oil to the inside of the piston for cooling as well as lubrication.

Referring next to FIG. 2, conventional ring terminology is illustrated. This includes the scuff band A, which is one or more raised bands of piston material used in some piston designs to reduce scuffing. The groove depth B is the distance between the back of the ring groove and the cylinder wall with the piston centered. The groove root diameter C represents the piston diameter measured at the back of the groove. This may vary between grooves on the same piston.

The land diameter D is the diameter of a given land. This can also vary by design from the top to the bottom of the piston. The land clearance E is the difference in diameter between the cylinder bore and the land diameter. "E" represents one-half of the total.

The skirt clearance F is the difference in diameter between the cylinder bore and the piston skirt diameter. In this case "F" represents one-half the total difference. The skirt groove G is a ring groove cut below the pin bore to carry an oil ring. The pin bore offset H is the distance the pin bore is offset from center and the groove spacer I is used on re-grooved pistons to return a ring groove to specifications or, in some performance applications, to facilitate the use of narrower ring sets than for which the grooves were originally designed.

FIG. 3 illustrates ring terms and measurements wherein the free gap A is the ring end clearance when the ring is uncompressed. The compressed gap B, also known as the ring gap, is the end gap measured when the ring is installed.

The radial wall thickness C is the distance between the inside and outside faces of the ring wall. The ring diameter D is the diameter of the ring measured with the ring installed on the piston, and the inside diameter E is measured with the ring installed on the piston. The ring sides F is the top and bottom surfaces of the ring. The ring face G is the part of the ring that is in contact with the cylinder wall. The side clearance H is the clearance between the ring groove and the ring side F.

The ring width I represents the thickness of the ring between the top and bottom faces F. Torsional twist J as shown in FIG. 3D is a result of an imbalance in the compression of the upper and lower sides F of the ring, causing the ring to twist when compressed. This torsional twist is accounted for when attempting to seal both the ring in the groove and the ring to the cylinder wall. Finally, the back clearance K is the distance between the inside diameter of the ring and the bottom of the ring groove when the ring is installed on the piston.

In the design of combustion engines, there are certain applications in which high power and torque in the 1000-

2000 rpm range is desired. Because most engines are designed to operate at a higher rpm range, the low performance in the 1000-2000 rpm range is largely due to friction, and most of it caused by ring friction. Various designs have been proposed for reducing ring friction while maintaining performance levels. For example, U.S. Pat. No. 4,596,179, is directed to a reciprocating machine having a cylinder, a piston performing reciprocating movement within the cylinder and rollers mounted on each side portion of the piston in rolling contact with the cylinder. As shown in FIG. 1 of this patent, the rollers are mounted below the rings and are designed to maintain the piston in alignment with the cylinder and prevent friction resulting from side thrust and lateral oscillating movements of the connecting rod as exerted on the piston. The use of these rollers would be inappropriate for sealing the piston in the cylinder because their design permits large amounts of blow-by.

U.S. Pat. No. 4,442,759 describes a piston and cylinder in a hydraulic power booster having rollers mounted in a piston groove and maintained in radial contact with the cylinder wall by way of a leaf spring. These rollers are received in grooves in the cylinder wall to prevent torsional twisting of the piston due to forces exerted on a spindle coupled thereto. These rollers would be ineffective in preventing blow-by and sealing a combustion chamber.

BRIEF SUMMARY OF THE INVENTION

The disclosed embodiments are directed to a rolling compression ring for use with a piston in a combustion engine, to a combination piston and roller compression ring taken alone and when mounted within a cylinder block, an engine formed from the same, and methods of forming a ring, a piston, a piston and ring combination, a short block and engine formed therefrom, including a lubrication system.

In accordance with one embodiment of the invention, a piston ring is provided that includes an annular body having a plurality of races formed therein, a plurality of ellipsoid rollers retained within respective races in the annular body. Preferably, the ellipsoid rollers have an arcuate sidewall of a radius that corresponds closely to the radius of the annular body, and the races have ellipsoid-shaped seats in which the rollers are mounted.

In accordance with a version of the foregoing embodiment, at least one oil passageway is formed in the body for allowing oil to pass between an interior side of the annular body and a face of the annular body, particularly to the area between the rollers and the seats.

In accordance with a version of the foregoing embodiment, the end walls of each of the rollers is convex to reduce friction between the rollers. Ideally, there is a 0.01 inch gap between rollers when seated in the races of the annular body.

In accordance with a version of the foregoing embodiment, the rollers are spaced apart a sufficient distance to not block an oil passageway formed in the annular body, thus forming a rolling oil ring.

In accordance with another embodiment of the invention, a piston and ring combination is formed using the embodiment of the ring described above and the various aspects thereof.

In accordance with another embodiment of the invention, a short block and engine are formed using the piston and ring combination from the embodiment described above.

In accordance with another embodiment of the invention, a method of forming a ring is provided that includes providing an annular body having a plurality of races formed therein and a plurality of rollers retained within the respective races in the body. Ideally, the races are formed as ellipsoid-shaped seats and the rollers are formed having convex sidewalls with ellipsoid curvature to match the curvature of the seat and to match the curvature of the annular body.

In accordance with a version of the foregoing embodiment, at least one oil passageway is formed in the annular body for allowing oil to pass between the face of the annular body and a backside of the annular body and between the seats and the rollers.

In accordance with a version of the foregoing embodiment, the rollers are formed to have end walls that are convex to reduce friction between rollers.

In accordance with still yet a further aspect of the foregoing embodiment, the ellipsoid-shaped seats are formed so that there is a gap of at least 0.01 inch between rollers when a compression ring is formed and a larger gap between rollers when an oil ring is formed.

In accordance with another embodiment of the invention, a method for forming a piston in combination with the method of forming a ring above is provided that includes forming a groove in the piston to receive the ring.

In accordance with a version of the foregoing embodiment, the method includes forming oil passageways in the piston to accommodate oil passing through the ring. In accordance with another embodiment of the invention, a method of forming a short block and a corresponding engine is provided that includes forming a piston and ring combination as described above and further including forming oil passageways in a connecting rod in combination with the piston and ring to lubricate the same.

The rings formed in accordance with the present invention provide substantially reduced friction between the piston and the cylinder wall, which increases performance at all rpms and allowing further reduction in the speed of the engine. Reducing friction also eliminates heat increases caused thereby. In addition, improved lubrication and oil control is provided for protection of the bearings and various moving parts in the engine as a result of use of the rings of the present invention. In addition, cooler and cleaner oil is provided, contaminant buildup is reduced above and below the ring, and increased pressure of the ring against the wall through all four cycles of the engine is provided, increasing performance at all speeds.

BRIEF DESCRIPTION OF THE SEVERAL VIEWS OF THE DRAWING

The foregoing advantages and features of the present invention will be more readily appreciated as the same become better understood from the following detailed description when taken in conjunction with the accompanying drawings, wherein:

FIGS. 3A-3E illustrate conventional features and dimensions of known rings;

DETAILED DESCRIPTION OF THE INVENTION

Figure 1:
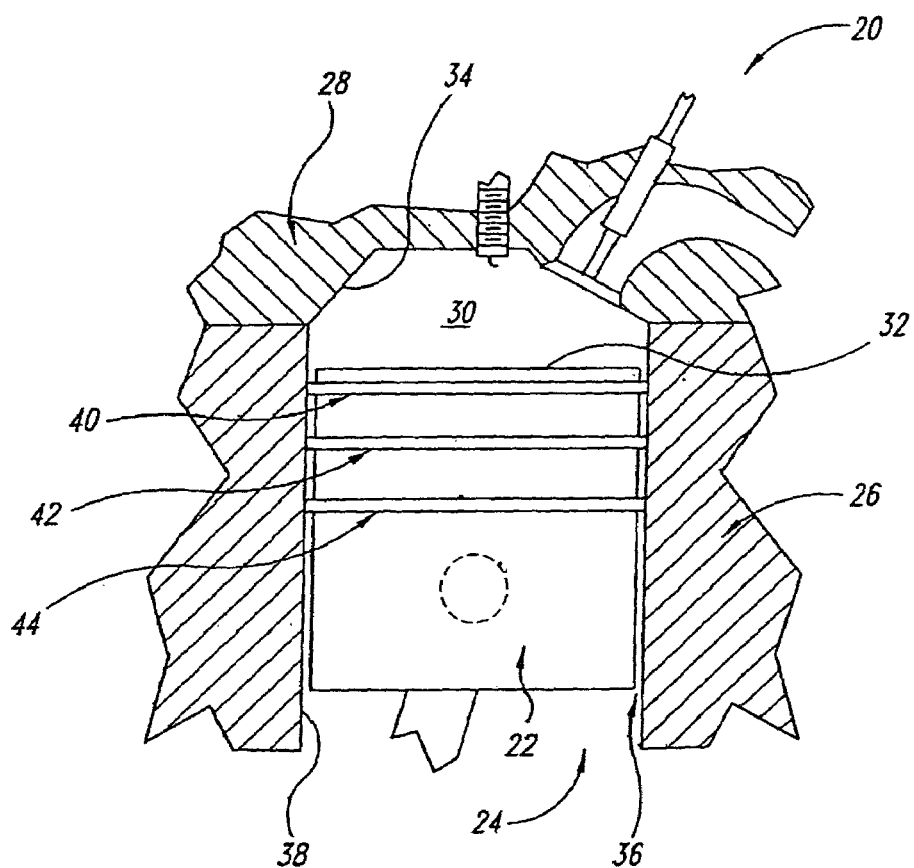
FIG. 1 is a partial cross-sectional view of a piston mounted in a cylinder in a known combustion engine arrangement.
Figure 2:
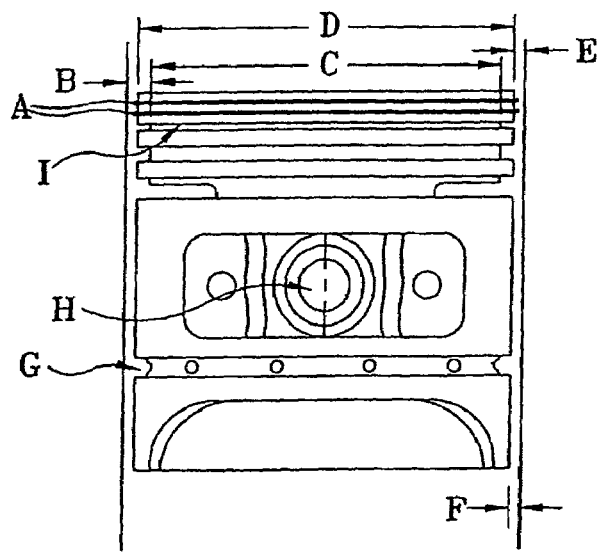
FIG. 2 is a side cross-sectional schematic of a piston and cylinder illustrating various features and aspects of known pistons and ring configurations.

Referring initially to FIGS. 4-7, shown therein is one embodiment of the invention in the form of a rolling compression ring 50 having a body 52 with a top wall 54, a bottom wall 56 and a back wall 58 that is preferably integrally formed with the top and bottom rims 5 and, 6. An interior side 60 of the ring 50 has a plurality of races 62 formed therein.

Figure 5:
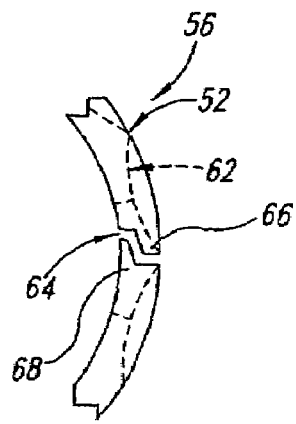
FIG. 5 is a broken view of a section of the rolling compression ring of FIG. 4.

As shown in FIG. 5, the body 52 of the ring has an opening 64 formed therein that permits the ring 50 to be expanded in its diameter to fit over a piston. The opening is formed by two L-shaped notches 66, 68 formed on the ends of the ring 50. These notches 66, 68 on the compression ring 50 are used with the embodiment depicted in FIGS. 13 and 14, as will be described in more detail herein. This configuration enables the ring 50 to seal with oil pressure from behind. More particularly, as shown in FIGS. 6 and 7, openings 70 are formed in each of the races 62 to permit the passage of oil therethrough.

In one embodiment, the body 52 of the ring 50 is formed of a suitable material such as gray iron, steel, or the like, and the races 62 formed therein may be laser hardened. Bearings 72 that ride in each of the races 62 may be formed from chrome steel. In use, the upper rim 5 of the ring 50 is typically not heat treated and is formed to rest approximately $\frac{1}{50,000}$ inch or less from a cylinder wall. That is, when the compression ring is used as the top ring on a piston it is formed to have this clearance. However, when used as a center compression ring, both the top and bottom rims 5, 6 are typically approximately $\frac{1}{5000}$ inch from the cylinder wall to permit drainage of oil. The lower rim 6 of a top compression ring is also typically formed to have a clearance $\frac{1}{5000}$ inch from the cylinder wall.

Figure 4:
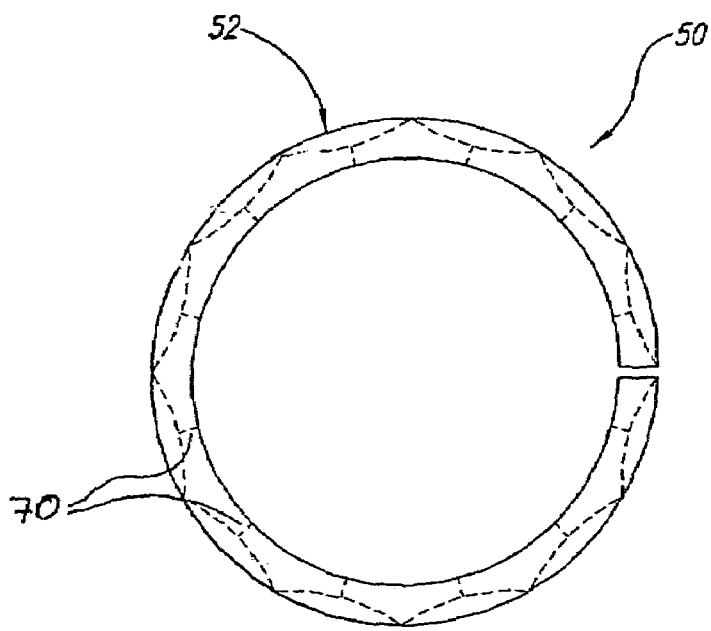
FIG. 4 is a top plan view of a rolling compression ring formed in accordance with the present invention.
Figure 6:
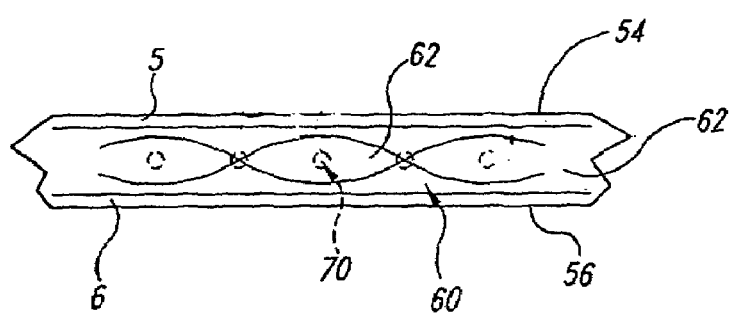
FIG. 6 is a side view of FIG. 4.
Figure 7A:
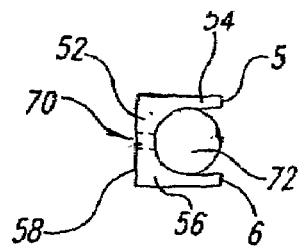
FIG. 7A is a partial cross-sectional side view of the rolling compression ring of FIG. 4.
Figure 7B:
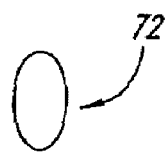
FIG. 7B is an isometric illustration of a bearing formed in accordance with the present invention.

As can be seen from FIGS. 4-6, the races 62 may have a concave shape, such as a semi-prolate ellipsoid shape. The bearing 72 or a portion thereof, has a matching shape. As viewed from the top in FIG. 4, the radius of curvature of the bearing 72 is similar to the radius of curvature of the exterior edge of the body 52. As shown in FIG. 7B, the race 72 is in the shape of a prolate ellipsoid. In other embodiments, the bearing 72 is barrel shaped having a radius of curvature corresponding substantially to the radius of the body 52.

Figure 8:
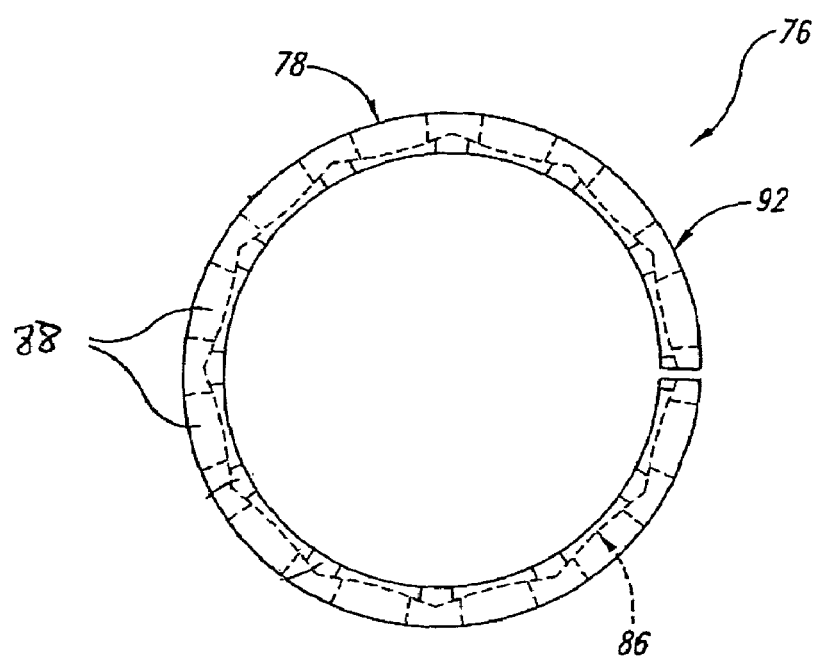
FIG. 8 is a top plan view of a rolling oil ring formed in accordance with the present invention.
Figure 9:
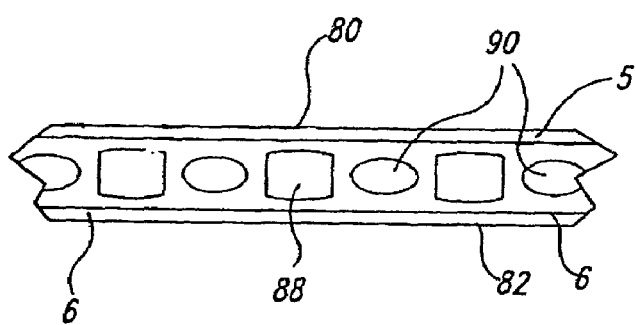
FIG. 9 is a side view of a portion of the rolling oil ring of FIG. 9.
Figure 10:
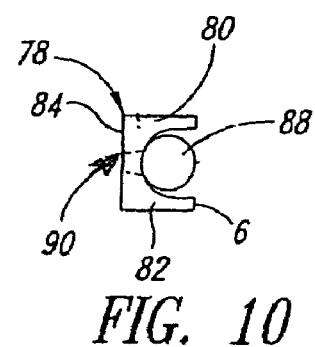
FIG. 10 is a cross-sectional illustration of the rolling oil ring of FIG. 8.

Turning next to FIGS. 8-10, shown therein is an illustration of a rolling oil ring 76 having a body 78 formed to have a top wall 80, bottom wall 82, and back wall 84. Races 86 are formed in the body 78 to accommodate bearings 88 that have a shortened length to permit oil drainage through enlarged openings 90 formed in the body 78. Bearings having a shortened length may be accomplished by truncating the ends of ellipsoid or prolate shapes.

As in the previous embodiment, the radius of curvature of the races 86 is substantially the same as the radius of curvature of the exterior edge 92 of the body 78, and the bearings 88 are typically formed accordingly. In one embodiment, the upper rim 5 is designed to have a clearance of approximately $\frac{1}{5000}$ inch from the cylinder wall, and the lower rim 6 is configured to have a clearance of approximately $\frac{1}{5000}$ inch from the wall.

Figure 11:
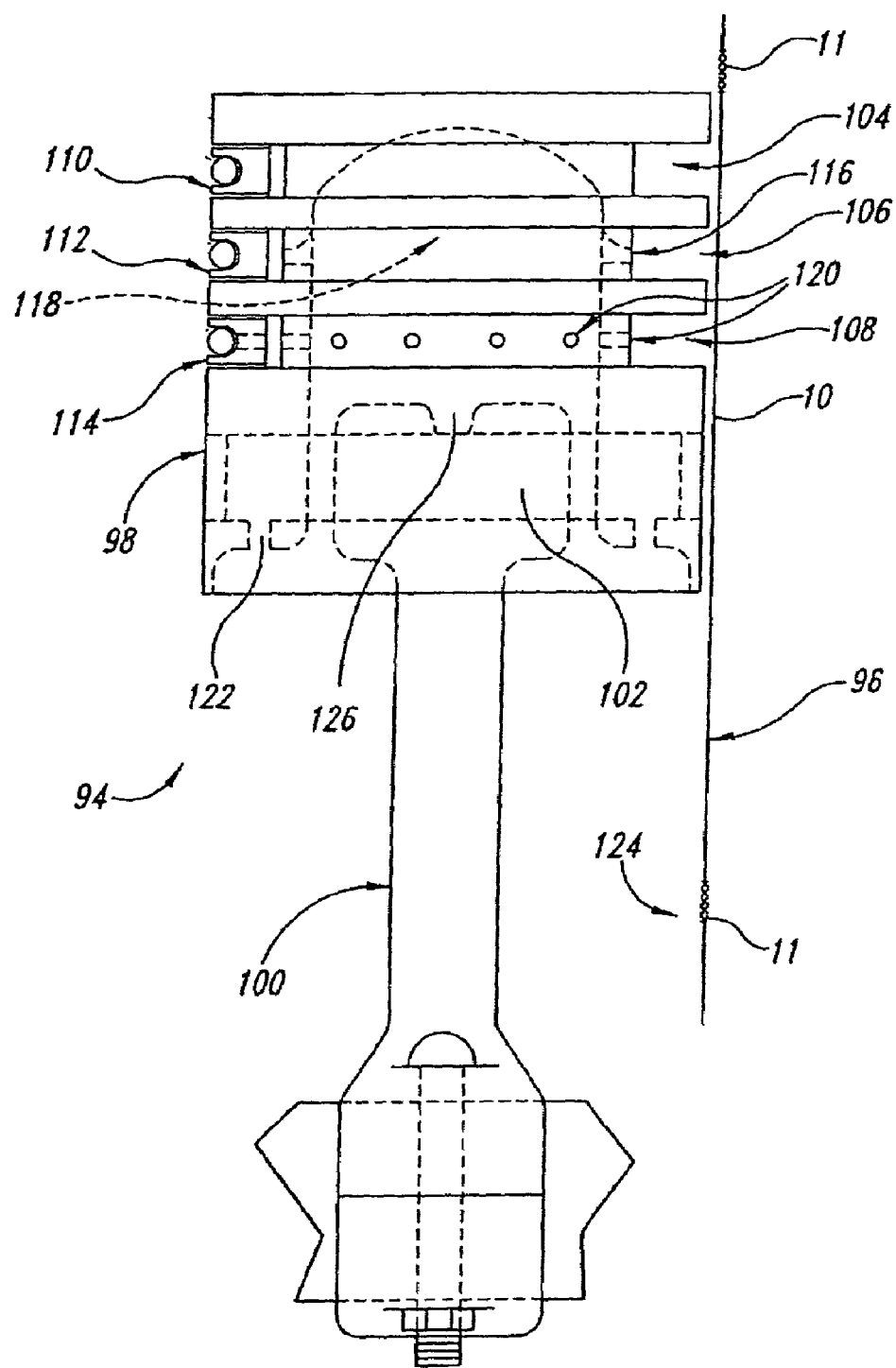
FIG. 11 is a side view of a piston and cylinder formed in accordance with another embodiment of the invention.

FIG. 11 shows a first oil plan formed in accordance with the present. The illustrated system provides a means for distributing oil to piston rings, such as the piston rings described hereinabove In the illustrated embodiment, a piston and connecting rod assembly 94 is shown in relation to a cylinder wall 96. More particularly, a piston 98 is shown coupled to a connecting rod 100 via a wrist pin 102 in a conventional fashion. Three ring grooves are formed in the piston 98, which are a top ring groove 104, a second ring groove 106, and a third ring groove 108. Mounted in each of these grooves may be rolling rings formed in accordance with the present invention as described above. Alternativley, two or more of the grooves may be occupied by a conventional piston compression or oil ring. In one embodiment, a rolling compression ring 110 is mounted in the top ring groove 104, a middle rolling compression ring 112 is mounted in the second ring groove 106, and an oil ring 114, preferably a rolling oil ring is mounted in the third ring groove 108.

An oil passageway 116 is formed in the body of the piston to communicate between an interior of the piston and one of the ring grooves, such as the second ring groove 106. Oil drain holes 120 may be formed in the body of the piston to communicate between the interior 118 of the piston and the third ring groove 108.

The piston 98 typically includes piston pin oil passageway 122 to provide oil to the wrist pin 102, which allow drainage of oil in the present invention.

In some embodiments, the cylinder wall 96 is nickel plated and may include an optional trim area 24 for the top rim 5 of the compression ring 110 and the bottom rim 6 of the oil ring 114. This trim area 124 is a raised file-like area of the cylinder wall (about $\frac{1}{100,000}$ inch) for trimming the rings in order to keep them from touching the cylinder wall 96. In some embodiments, the body of the piston 98 is hypereutectic to provide a close fit between the piston 98 and the cylinder wall 96.

In this embodiment, a conventional oil ring system is used for the wrist pin 102 where oil is collected by the oil ring 114 and passed through the openings 120 to an oil passage 126 formed in the top of the connecting rod 100 that communicates with the wrist pin 102. Oil is directed to the oil passageway 116 in the second ring groove 106 to enter behind the ring, then over it and to the bearing in the middle rolling compression ring, and then out through the oil drain holes 120.

Figure 12:
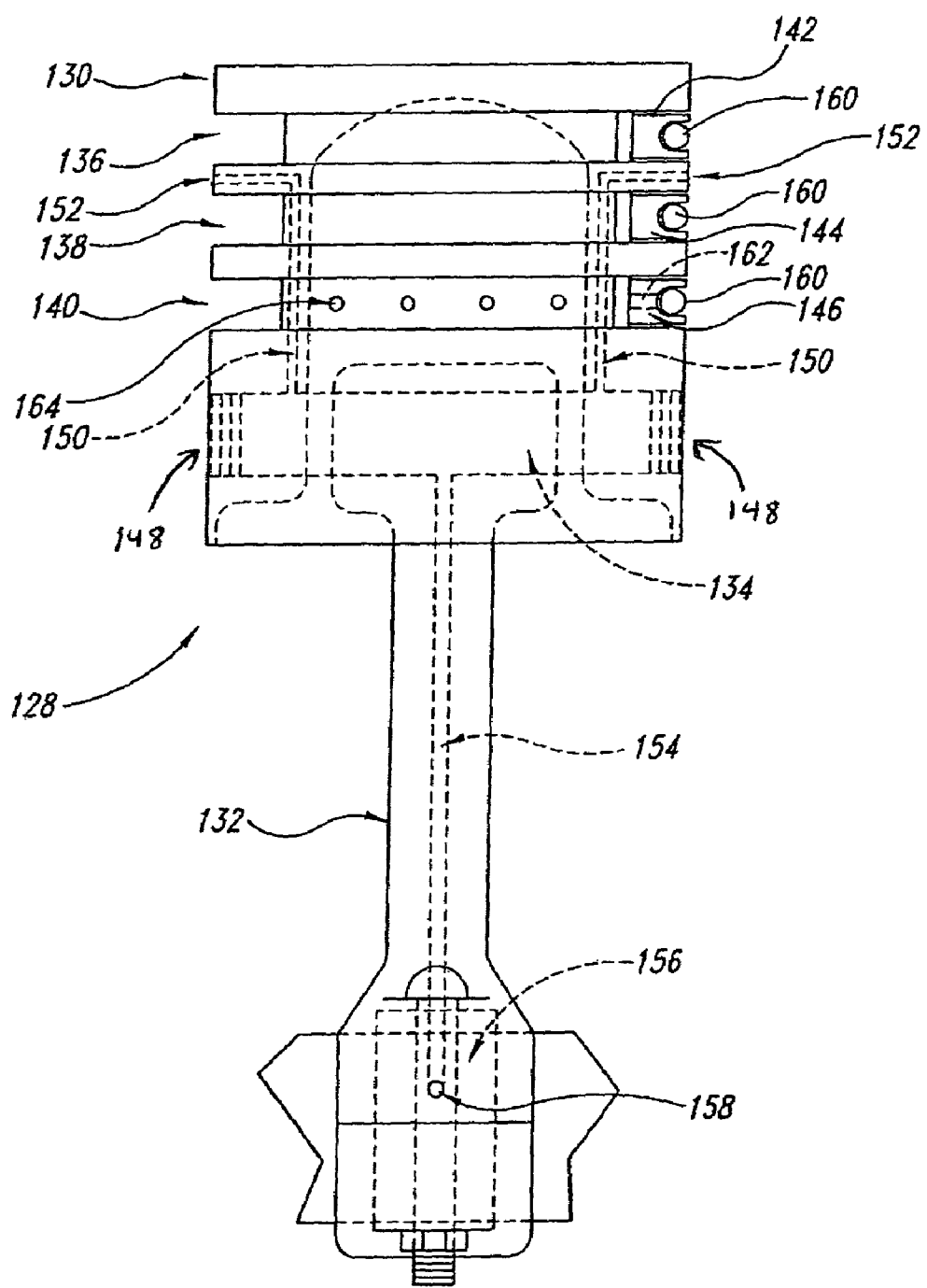
FIG. 12 is a side view of a piston formed in accordance with a further embodiment of the invention.

Turning next to FIG. 12, shown therein is an alternative piston-connecting rod arrangement 128 in which a piston 130 is coupled to a connecting rod 132 via a wrist pin 134.

The piston 130 includes a top ring groove 136, second ring groove 138, and third oil ring groove 140 in which are mounted, respectively, a top compression ring 142, a second compression ring 144, and an oil ring 146, all of which may be formed in accordance with the teachings of the present invention.

In this embodiment, the piston 130 has the ends 148 of the wrist pin 134 sealed and an oil passageway 150 leads from the wrist pin 134 through the piston 130 to an outlet 152 formed between the top ring groove 136 and the second ring groove 138. Another oil passageway 154 is formed in the connecting rod 132 to communicate between a rod bearing 156 and the wrist pin 134. An opening 158 in the rod bearing aligns with an oil hole (not shown) in the crankshaft (not shown) once every revolution. Oil is pumped through the passageway 154 and the connecting rod 132 to the wrist pin 134, where it then passes through the oil passageway 150 in the piston 130 to the outlet 152. The oil then is dispersed to the bearings 160 in each of the three rings 142, 144, 146. Note should be taken that the top compression ring 142 and second compression ring 144 do not have oil passageways as does the oil ring 146, which has passageways 162 communicating with the third oil ring groove 140. Oil passes herethrough to the drain openings 164 and back to the oil pan. The advantage here is that there is positive oil flow producing more oil to the components, the oil is cooler, resulting in better heat transfer and removal of contaminants.

Figures 13, 14:
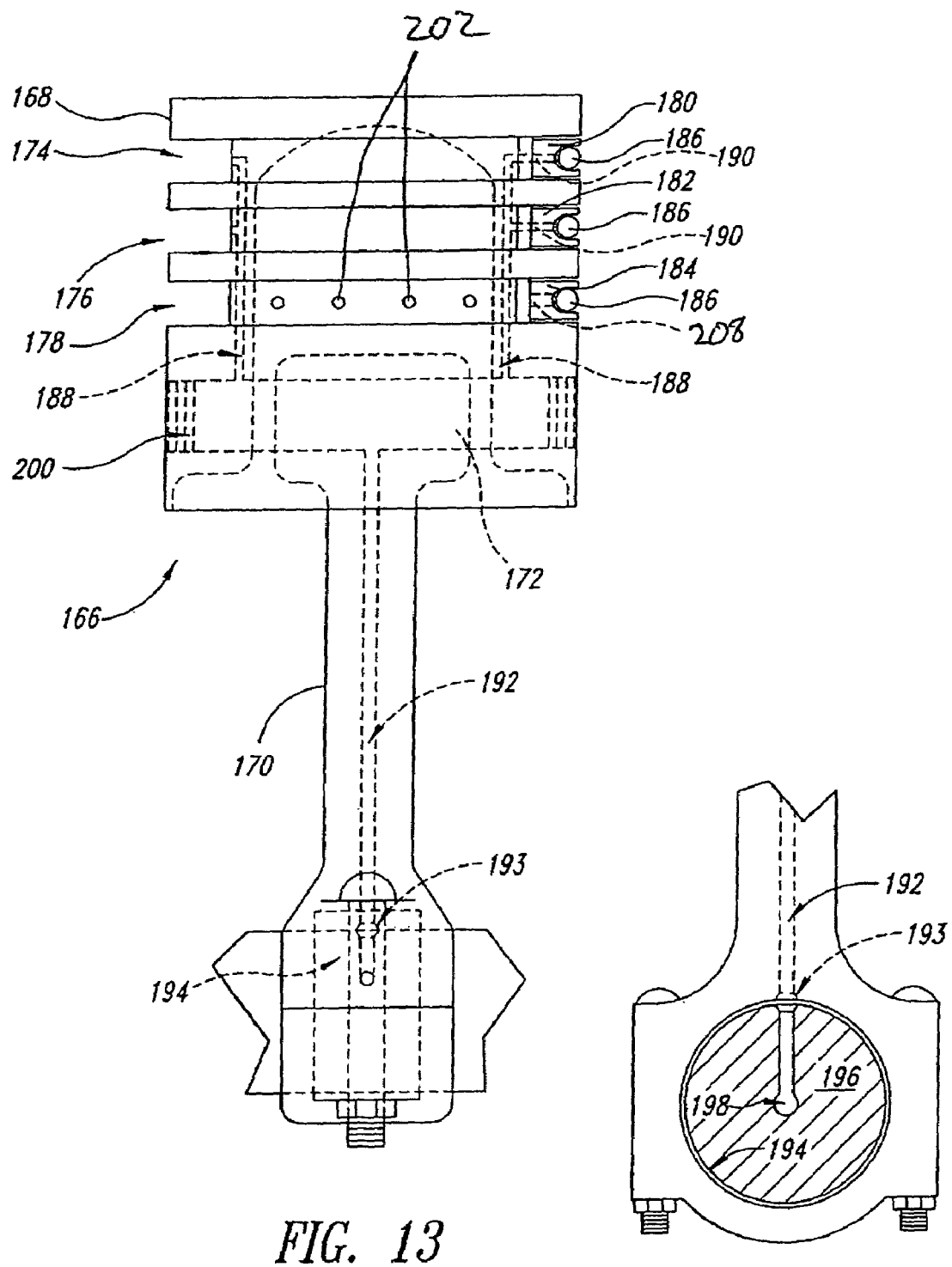
FIG. 13 is a side view of a piston and connecting rod formed in accordance with still yet another embodiment of the invention.
FIG. 14 is a front view of a portion of the connecting rod of FIG. 13.

FIGS. 13 and 14 illustrate yet another arrangement 166 of a piston 168 coupled to a connecting rod 170 through a wrist pin 172. The piston 168 in this embodiment includes the top ring groove 174, second ring groove 176, and the third oil ring groove 178 that are configured to receive respectively the top compression ring 180, second compression ring 182, and oil ring 184, all of which may be formed in accordance with the teachings of the present invention and include the unique bearings 186 as described above.

In this embodiment, the piston 168 has oil passageways 188 communicating with the wrist pin 172 and the grooves 174 and 176. Corresponding oil passageways 190 are formed in the rings 180 and 182. In addition, an oil passageway 192 is formed in the connecting rod to communicate between the wrist pin 172 and the bearing 194 between the connecting rod 170 and the crankshaft 196, which includes a corresponding oil passageway 198. The oil passageway 192 may include an enlarged portion 193 that has the affect of giving more time for the oil to pass from the crankshaft 196 through the bearing 194. This may be accomplished by countersinking the crankshaft 196 and the bearing 194, as well as the connecting rod 170.

In this embodiment, pressurized oil from the crankshaft passageway 198 passes through the rod passageway 192 to the wrist pin 172, which is sealed at its ends 200. From the wrist pin 172, the pressurized oil passes through the piston 168 via the oil passageways 188 formed therein and thence through each of the ring passageways 190 to the bearings 186 in each of the rings 180, 182. A gap above and below the rings with respect to the pistons 168 is made small enough to trap the oil and force each of the rings 180, 182 against a cylinder wall. Notches in the rings 180, 182 (L-shaped notches 66, 68 described above) are urged to close together, forcing oil to move around the ring bearings 186. Oil is then collected by the oil ring 184 where it passes through a ring passageway 208 and holes 202 formed in the groove 178 into the oil passageway 122. The advantages of this embodiment of the invention is to direct cooler and cleaner oil to the ring bearings. In addition, contaminant buildup is reduced above and below the rings 180, 182, 184. In addition, increased pressure of the ring against the wall through all four cycles of the piston stroke enhances performance.

Figure 15:
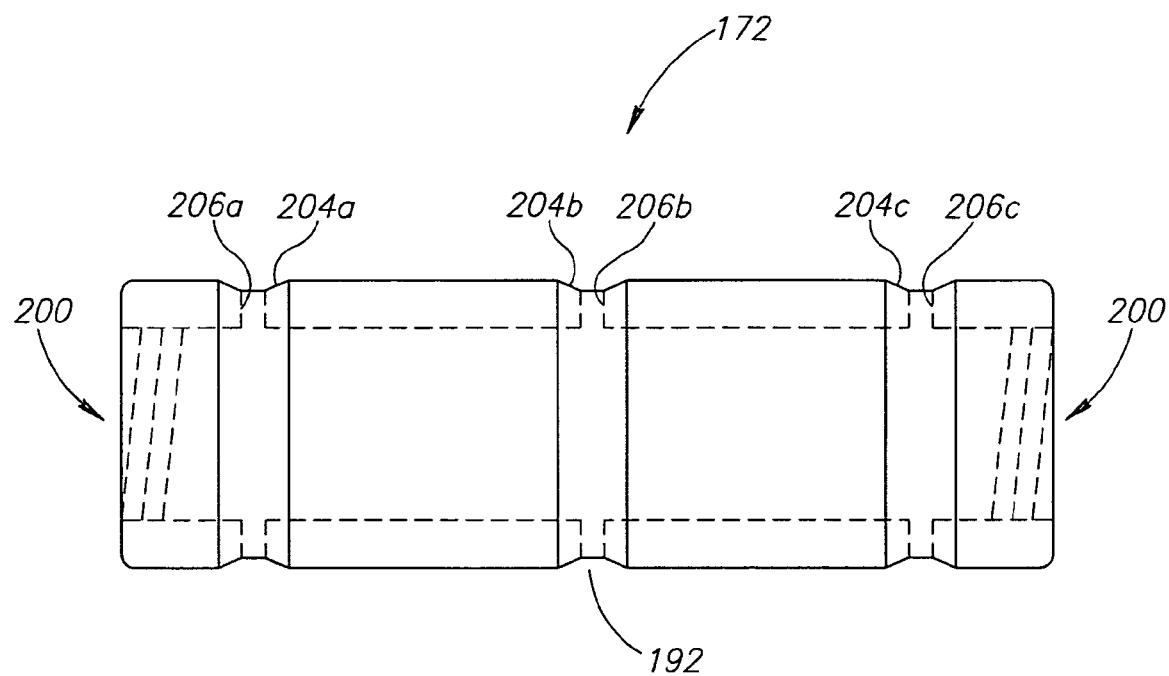
FIG. 15 is a front view of a wrist pin having oil grooves formed therein in accordance with an embodiment of the present invention.
Figure 16:
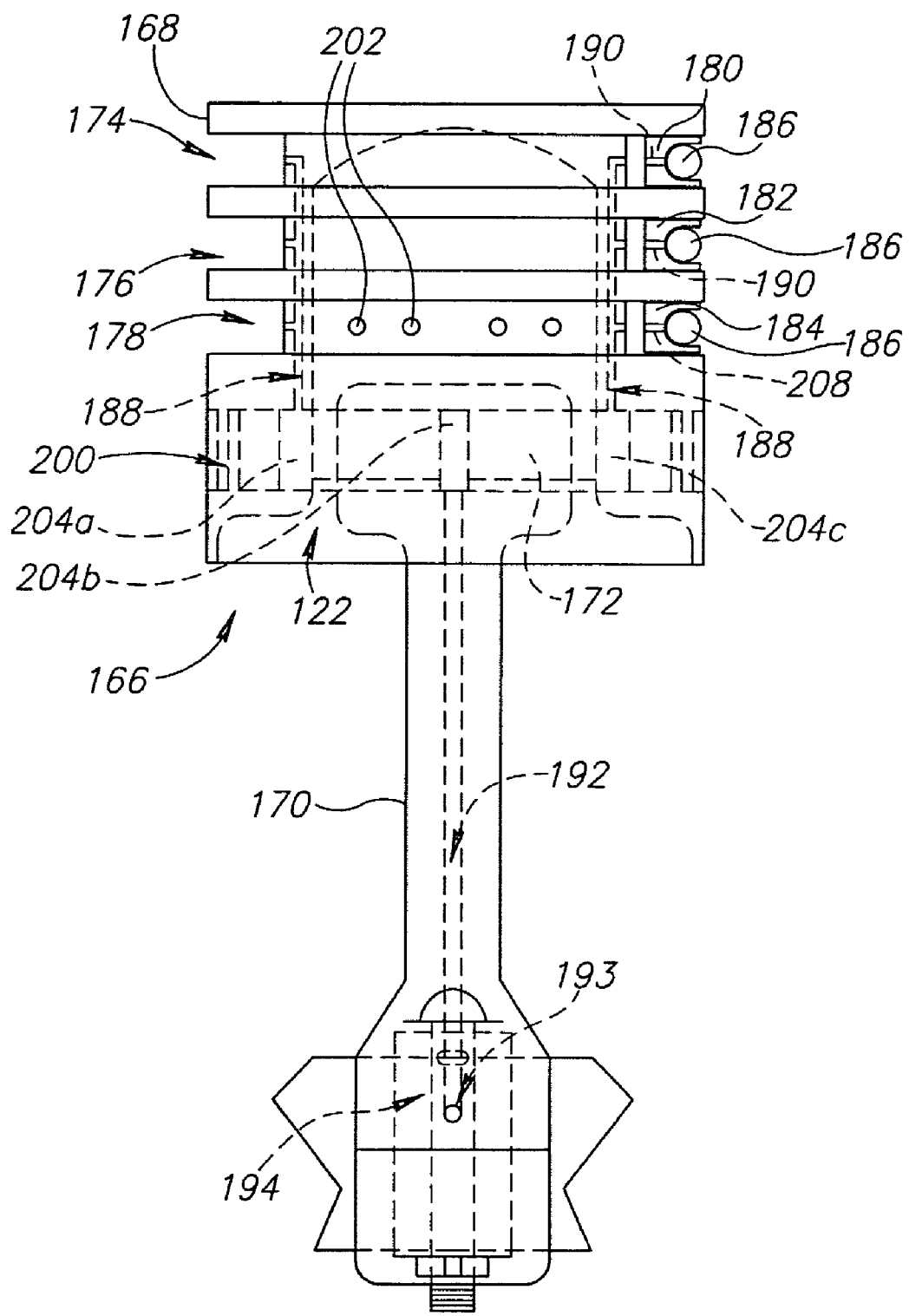
FIG. 16 is a front view of a piston and connecting rod incorporating the wrist pin of FIG. 15.

Referring to FIGS. 15-16, in an alternative embodiment, the wrist pin 172 includes grooves 204a-204c. The ends 200 of the wrist pin 172 may be plugged or sealed by means of threaded plugs inserted in the ends 200. Apertures 206a-206c pass through the wall of the wrist pin 172 into the grooves 204a-204c. The groove 204b aligns with the oil passageway 192 to allow oil to enter the wrist pin 172. Grooves 204a, 204c align with oil passageways 188 to allow oil to flow from the wrist pin 172 to the grooves 174, 176. As in the embodiment of FIG. 13, oil drains through the apertures 164 in groove 178 into the passageways 122 formed in the piston.

The size of the rings 180, 182, 184 may be varied to control the distribution and flow of oil at the boundary between the piston and cylinder. For example, in one embodiment the top rim 5 of ring 180 is slightly larger in diameter than the bottom rim 6 of ring 180 the top and bottom rims 5, 6 of rings 182, 184. The larger top rim 5 of the ring 180 is not hardened in some embodiments such that the larger rim 5 of the ring 180 will wear down to conform to the walls of the cylinder.

In the preferred embodiment, top rim 5 of ring 180 has a diameter such that the gap between the rim 5 and the cylinder wall is about $1/50,000$ to $1/100,000$ inch. The bottom rim 6 of ring 180 and both rims 5, 6 of rings 182, 184 have a diameter such that there is about a $1/5,000$ in. gap between the rims 5, 6 and the walls of the cylinder.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A compression ring for a piston comprising:
   an annular body having a plurality of races formed therein, each race having a wall, an upper rim, and a lower rim that define an inner surface; and
   a plurality of ellipsoid rollers, each ellipsoid roller having an axis of elongation and a bearing surface that corresponds closely to at least a portion of the inner surface of the annular body, the ellipsoid rollers each disposed within one of the plurality of races, wherein the ellipsoid rollers operate in cooperation with the upper and lower rims of the race to substantially reduce blow-by.

2. A compression ring for a piston comprising:
   an annular body having a plurality of races formed therein, each race having a wall, an upper rim, and a lower rim that define an inner surface; and
   a plurality of ellipsoid rollers having a bearing surface shaped as a revolution of a section of an arcuate shape about an axis of elongation, the ellipsoid rollers each disposed within one of the plurality of races, wherein the annular body includes an aperture extending from the the inner surface of at least one of the races, and wherein the ellipsoid rollers operate in cooperation with the upper and lower rims of the race to substantially reduce blow-by.

3. A piston assembly comprising:

a piston comprising a combustion face and a cylindrical body extending downwardly from the combustion face;

a compression ring having an annular body sized to receive at least a portion of the piston, the annular body having a plurality of races, each race having a wall, an upper rim, and a lower rim that define an inner surface, the compression ring further having a plurality of ellipsoid rollers, each ellipsoid roller having an axis of elongation and a bearing surface that corresponds closely to at least a portion of the inner surface, the ellipsoid rollers each disposed within one of the plurality of races, wherein the ellipsoid rollers operate in cooperation with the upper and lower rims of the race to substantially reduce blow-by.

4. The piston assembly of claim 3, further comprising a plurality of oil passages formed in the piston having openings thereof proximate the bearing surfaces of the plurality of ellipsoid rollers.

5. The piston assembly of claim 3, wherein the compression ring is positioned within a groove formed in the piston.

6. The piston assembly of claim 3, further comprising an annular seal circumscribing the cylindrical piston and positioned below the combustion face of the piston.

7. The piston assembly of claim 4, wherein the annular seal is disposed within a grove firmed in the cylindrical portion.

* * * * *